United States Patent [19]

Kurahayashi et al.

[11] 4,456,437
[45] Jun. 26, 1984

[54] REFRIGERANT COMPRESSOR

[75] Inventors: Takahisa Kurahayashi, Fujisawa; Juji Ojima, Ebina, both of Japan

[73] Assignees: Matsushita Reiki Co., Ltd., Osaka; NHK Spring Co., Ltd., Kanagawa, both of Japan

[21] Appl. No.: 333,062

[22] Filed: Dec. 21, 1981

[30] Foreign Application Priority Data

Dec. 22, 1980 [JP] Japan ................................ 55-182681

[51] Int. Cl.³ ...................... F04B 39/02; F04D 29/28; F01M 1/00; F04C 29/02
[52] U.S. Cl. .................................. 417/368; 417/410; 417/902; 415/73; 184/6.16; 418/88
[58] Field of Search ............... 417/366, 368, 372, 410, 417/424, 902, 423 R; 184/6.16, 26, 31; 415/72, 73; 418/88

[56] References Cited

U.S. PATENT DOCUMENTS

| | | | |
|---|---|---|---|
| 1,665,097 | 4/1928 | Huguenin | 417/902 |
| 1,711,193 | 4/1929 | Wunderlich | 417/423 R |
| 2,928,588 | 3/1960 | Sudmeier | 417/902 |
| 3,003,684 | 10/1961 | Tarleton | 417/902 |
| 3,465,953 | 9/1969 | Shaw | 417/368 |
| 3,514,225 | 5/1970 | Tuneo Monden et al. | 417/902 |
| 3,877,853 | 4/1975 | Harlin | 184/6.16 |
| 3,880,548 | 4/1975 | Kirby, Jr. | 198/659 |
| 4,406,594 | 9/1983 | Smaby | 417/368 |

Primary Examiner—Carlton R. Croyle
Assistant Examiner—Paul F. Neils
Attorney, Agent, or Firm—Stevens, Davis, Miller & Mosher

[57] ABSTRACT

A refrigerant compressor for use in refrigerators, air conditioners, heat pumps or the like apparatus. The refrigerant pump has a casing which encases a combination of a compressor and an electric motor. A spring guide has an attaching base portion fixed to a bearing supporting a crank shaft driven by the motor, and an oil pipe connected to the attaching base such that the inside of the oil pipe opens to one end of the crank shaft. The oil pipe is bent so that the free end thereof is immersed in the lubricating oil in the case. The oil pipe receives a closely-coiled spring which is fixed at its one end to the end of the crank shaft while the other end is immersed in the lubricating oil. As the compressor operates, the coiled spring rotates in the oil pipe so that the lubricating oil is sucked by the lead of the coiled spring through the gap formed between the inner peripheral surface of the oil pipe and the coiled spring.

5 Claims, 1 Drawing Figure

U.S. Patent    Jun. 26, 1984    4,456,437
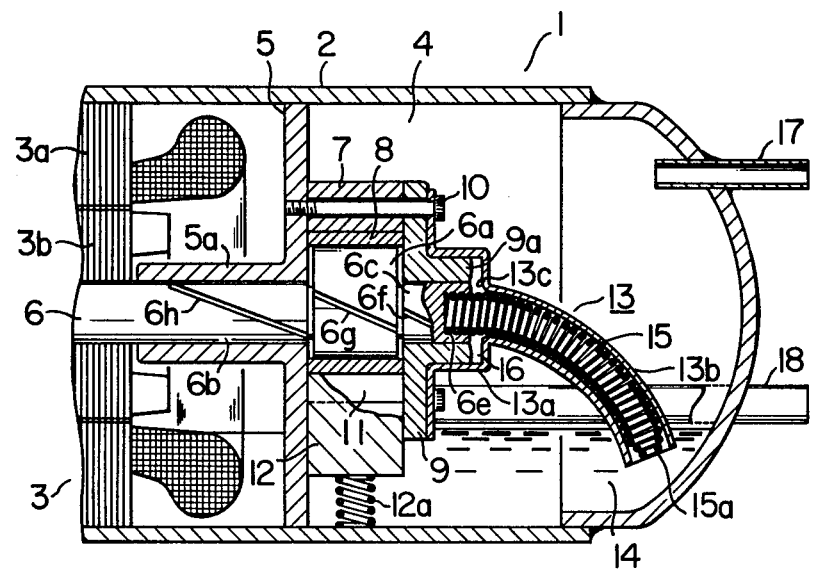

REFRIGERANT COMPRESSOR

BACKGROUND OF THE INVENTION

1. Field of the Invention

The present invention relates to a refrigerant compressor for use in refrigerators, air conditioners, heat pumps and so forth.

2. Description of the Prior Art

Hitherto, there have been proposed various types of lubrication systems for refrigerant compressors. For instance, in the refrigerant compressors having a vertical crank shaft, the lubricating oil is supplied by means of a viscosity pump or a pump which sucks and delivers the oil by making use of centrifugal force. Similarly, in the refrigerant compressors having a horizontal crank shaft, the supply of the lubricating oil is made by a mechanical pump such as a gear pump or by the action of a splash ring. It is also known to use a bubble pump making use of the flowing velocity of the compressed gas or to make use of a pressure differential in supplying the lubricanting oil.

The gear pump can stably supply the lubricating oil at a sufficiently high pressure and at a large delivery rate, but the cost of the gear pump is generally high. The splash ring, which is less expensive, cannot provide a sufficiently high delivery rate. The bubble pump or the lubricating system making use of the pressure differential also involves some problems concerning the rate of delivery of the lubricating oil, although the cost thereof is moderate.

SUMMARY OF THE INVENTION

Under these circumstances, the present invention aims as its major object at providing a refrigerant compressor having a lubricating system capable of overcoming the abovedescribed problems of the prior art.

Accordingly, an object of the invention is to provide a refrigerant compressor having a lubrication system having a small number of parts and easy to assemble, capable of making a stable supply of the lubrication oil to the portions of the compressor requiring the lubrication.

Another object of the invention is to provide a refrigerant compressor having a lubrication system capable of effectively supplying the lubricating oil irrespective of whether the crank shaft is arranged vertically or horizontally.

Still another object of the invention is to provide a refrigerant compressor having a lubrication system having a closely-coiled spring immersed in the lubricating oil, thereby to produce the wear of the oil pipe and operation noise.

A further object of the invention is to provide a refrigerant compressor in which the pressure of contact between the mass of the coiled spring and the oil pipe is reduced to prevent the increase of electric power input to the electric motor.

BRIEF DESCRIPTION OF THE DRAWINGS

The accompanying sole FIGURE is a sectional view of an essential part of a refrigerant compressor in accordance with a preferred embodiment of the invention.

DESCRIPTION OF THE PREFERRED EMBODIMENTS

The refrigerant compressor generally designated at a reference numeral 1 has a closed case 2 in which encased are a driving section 3 incorporating an electric motor and a compressor section 4 constituted by a rotary compressor, the two sections being constructed as a unit with each other. The driving section 3 has a motor stator 3a which is forcibly fitted in and fixed into the closed case 2, and a rotor 3b. A crank shaft fitted in the rotor 3b is supported by a main bearing 5a integral with a side plate 5. The side plate 5 is fitted at a light pressure into the closed case 2 and then fixed to the latter by welding or the like measure. The crank shaft 6 has a journal portion 6c, eccentric portion 6a and a main shaft portion 6b which are connected integrally as illustrated. A cylinder plate 7 has a bore receiving a ring-shaped rotary piston 8 mounted on the eccentric portion 6a of the crank shaft 6. Another side plate 9 has a bearing integral therewith and adapted to rotatably support the journal portion 6c of the crank shaft 6.

Thus, the crank shaft 6 is rotatably supported at its main shaft portion 6b by the main bearing 5a on one side plate 5 and at its journal portion 6c by the bearing 9a of the other side plate 9. The main shaft portion 6b is extended into and tightly fitted in the rotor 3b of the electric motor constituting the driving section 3.

The side plate 5, cylinder plate 7 and the side plate 9 are assembled together into one body by means of tie bolts 10 to cooperate with one another in defining a compression chamber 11. The space in the compression chamber 11 is divided into a high-pressure chamber and a low-pressure chamber by a vane 12 which is resiliently biased by a vane spring 12a.

A reference numeral 13 generally designates a spring guide fixed integrally to the bearing 9a by means of the bolts 10. The spring guide 13 is constituted by an attaching base portion 13a fitting to the bearing 9a and an oil pipe 13b which is bent downwardly. The upper end of the oil pipe 13 is connected to the opening 13a in the attaching base portion 13a concentric with the crank shaft 6 while the lower end of the oil pipe 13 is immersed in the lubricating oil 14 collected at the lower portion of the space in the closed case 2. A reference numeral 15 designates a closely-coiled spring screwed and fixed into a threaded bore 6e formed in one end of the crank shaft 6. The coiled spring 15 extends into the oil pipe 13b through the opening 13c. The diameter of the coiled spring 15 is slightly reduced at the free end portion of the latter to form a restricted portion 15a of a frusto-conical form. An oil pressure chamber 16 is defined by the attaching base portion 13a, bearing 9a and the end surface of the crank shaft 6. The crank shaft 6 is provided in its peripheral surface with oil grooves 6f, 6g and 6h formed at the portions of the crank shaft facing the bearing 9a, rotary piston 6g and the main bearing 5a, respectively. A reference numeral 17 designates a discharge pipe through which the refrigerant gas compressed by the compressor is forwarded to a refrigeration cycle (not shown), while a reference numeral 18 denotes a suction pipe through which the gas returning from the refrigeration cycle is introduced into the compression chamber 11.

In operation, as the electric motor of the driving section 3 is energized to rotate the rotor 3b, the crank shaft 6 unitary with the rotor 3b is also rotated to cause a rotation of the rotary piston 8 thereby to compress the gas which has been sucked into the compression chamber 11 through the suction pipe 18. The compressed gas is then discharged through a delivery valve (not shown) into the space in the closed case 2 and temporarily stored in that space and then forwarded to the refrigeration cycle through the discharge pipe 17.

On the other hand, the rotation of the crank shaft 6 causes a rotation of the coiled spring 15 in the oil pipe 13b. In consequence, the oil 14 is sucked due to the lead of the coiled spring 15, through the annular gap formed bewteen the coiled spring 15 and the inner peripheral surface of the oil pipe 13b. The oil thus sucked is then discharged to the oil pressure chamber 16. Thereafter, the oil is fed from the oil pressure chamber 16 to the bearing 9a, rotary piston 8 and the main bearing 5a successively, through the oil groove 6f formed in the peripheral surface of the journal portion 6c of the crank shaft 6.

Although the invention has been described through specific form applied to a rotary type compressor, it will be clear to those skilled in the art that the invention can equally be applied to the compressors of the reciprocating type and screw type. The applicability of the invention will be further enhanced by suitably selecting the position of the end of the oil pipe such that the oil can be sucked up irrespective of whether the crank shaft extends horizontally or vertically.

Other changes and modifications are possible without departing from the spirit and scope of the invention which are limited solely by the appended claims.

What is claimed is:

1. A refrigerant compressor comprising: a case encasing a compressor section and a driving section including an electric motor; a crank shaft adapted to be driven by the rotor of said electric motor; an oil pipe connected at its one end to an opening of an attaching base fixed to a bearing of said crank shaft, the other end of said pipe being immersed in the lubricating oil collected in said case, said opening of said attaching base being substantially concentric with said crank shaft; said crank shaft having a journal portion, an eccentric portion and a main shaft portion, said journal portion being rotatably supported by said bearing which cooperates with said attaching base in defining an oil pressure chamber; and a closely-coiled spring received by said oil pipe, said coiled spring being fixed at its one end to one end of said crank shaft with the other end being immersed in said oil through an end opening of said oil pipe, said closely-coiled spring being screwed at its one end into a threaded bore formed in said end of said crank shaft, with the other end having a conical form.

2. A refrigerant compressor as claimed in claim 1, wherein said eccentric portion carries a rotary piston.

3. A refrigerant compressor as claimed in claim 1, wherein said oil pipe serving as a guide for said coiled spring is bent.

4. A refrigerant compressor as claimed in claim 3, wherein said crank shaft is held substantially horizontally.

5. In a refrigerant compressor of the type having a case, a compressor section and a driving section incorporating an electric motor, said compressor section and said driving section being encased by said case, and a crank shaft adapted to be driven by the rotor of said electric motor, an improvement which comprises that said crank shaft is held substantially horizontally and has a journal portion, an eccentric portion carrying a rotary piston and a main shaft portion, said refrigerant compressor further comprising a spring guide including an attaching base defining an oil pressure chamber and attached to a bearing supporting said journal portion and a bent oil pipe connected at its one end to an opening formed in said attaching base portion and immersed at its other end in the lubricating oil collected in said case, said opening of said attaching base being substantially coaxial with said crank shaft, said compressor further comprising a closely-coiled spring received by said oil pipe, said closely-coiled spring having adjacent turns closely contacting each other and screwed at its one end into a threaded bore formed in one end of said crank shaft while the other end has a frusto-conical form and is immersed in said lubricating oil.

* * * * *